(12) United States Patent
Lidster et al.

(10) Patent No.: US 7,931,926 B2
(45) Date of Patent: Apr. 26, 2011

(54) COMPOSITIONS AND METHODS FOR PRESERVING CUT APPLES

(75) Inventors: Perry D. Lidster, Yarrow (CA); William Duncan Powrie, North Vancouver (CA); Miriam O'Donovan, North Vancouver (CA); Cheong Kit Leung, Vancouver (CA)

(73) Assignee: NatureSeal, Inc., Westport, CT (US)

( * ) Notice: Subject to any disclaimer, the term of this patent is extended or adjusted under 35 U.S.C. 154(b) by 1230 days.

(21) Appl. No.: 10/551,813

(22) PCT Filed: Mar. 31, 2004

(86) PCT No.: PCT/CA2004/000483
§ 371 (c)(1),
(2), (4) Date: Jul. 10, 2006

(87) PCT Pub. No.: WO2004/086872
PCT Pub. Date: Oct. 14, 2004

(65) Prior Publication Data
US 2007/0042093 A1    Feb. 22, 2007

(30) Foreign Application Priority Data
Mar. 31, 2003  (CA) .................................. 2424200

(51) Int. Cl.
*C12H 1/12*   (2006.01)
(52) U.S. Cl. ......... 426/267; 426/270; 426/615; 426/654
(58) Field of Classification Search .................. 426/267
See application file for complete search history.

(56) References Cited

U.S. PATENT DOCUMENTS

| | | | |
|---|---|---|---|
| 3,764,348 A | 10/1973 | Huxsoll et al. | |
| 5,055,313 A * | 10/1991 | Warren | 426/268 |
| 5,443,739 A * | 8/1995 | Vogel et al. | 210/652 |
| 5,922,382 A | 7/1999 | Powrie et al. | |
| 5,925,395 A * | 7/1999 | Chen | 426/321 |
| 5,939,117 A | 8/1999 | Chen et al. | |
| 6,054,160 A * | 4/2000 | Gawad et al. | 426/270 |
| 2003/0104107 A1 * | 6/2003 | Gillota | 426/590 |
| 2004/0071845 A1 * | 4/2004 | Hekal et al. | 426/321 |

FOREIGN PATENT DOCUMENTS

| | | |
|---|---|---|
| DE | 36 24 035 A | 2/1987 |
| EP | 0 937 406 A | 8/1999 |
| EP | 1 010 368 A | 6/2000 |

OTHER PUBLICATIONS

Ponting, J.: "Refrigerated apple slices: preservative effects of ascorbic acid, calcium and sulphites", Journal of Food Science, vol. 37, No. 3, 1972, pp. 434-436.
Lidster, P.D. et al.: "Texture Modification of Processed Apple Slices by a Postharvest Heat Treatment", Journal of Food Science, vol. 44, 1979, pp. 998-1000.
Goray, J.R., et al.: "Postharvest Physiology and Quality Maintenance of Fresh-Cut Pears", Acta Horticulturae 464 (1998), Postharvest 96, R.L.Bieleski, et al. ed., pp. 231-236.
Buta, J.G., et al.: "Extending Storage Life of Fresh-Cut Apples Using Natural Products and Their Derivatives", J. Agric. Food Chem., vol. 47, No. 1, 1999.
Lidster, P.D.: "Tissue Conditioning of Stored Fruit", Proceedings XXIst International Horticultural Congress, Aug. 29, Sep. 4, 1982, Hamburg, Fed'l. Rep. Germany.
Office Action from Canadian Patent Application No. 2,662,297 dated Sep. 30, 2010, 3 pages.

* cited by examiner

*Primary Examiner* — Timothy M Speer
*Assistant Examiner* — Felicia C King
(74) *Attorney, Agent, or Firm* — Calfee, Halter & Griswold LLP

(57) ABSTRACT

This invention is a novel composition for preserving fresh cut apples comprising a mixture of ascorbic acid, and one or more of calcium chloride, calcium carbonate, magnesium chloride, calcium hydroxide, and optionally, citric acid or sodium citrate. This invention also relates to a method of preserving fresh cut apples by treating the cut apples with the novel composition dissolved in water and packaging the treated fresh cut apples in a modified atmosphere package.

21 Claims, No Drawings

COMPOSITIONS AND METHODS FOR PRESERVING CUT APPLES

TECHNICAL FIELD

This invention relates to novel compositions and methods for preserving fresh, cut apples, and more particularly, to compositions and methods used for extending the shelf life of fresh, cut apples process with or without modified atmosphere packaging.

BACKGROUND

Packaged, pre-cut fresh apples are appealing to consumers and food service operators because they are convenient, ready-to-use, and produce little or no waste for the consumers or food service operators. Cut apple pieces may be used as a snack, as an ingredient for mixed fruit salads, as a fruit topping for a dessert, for fruit juice preparation, or in many other applications. To be successful in the marketplace, the packaged, pre-cut apple pieces preferably retain acceptable quality attributes during storage periods of up to four weeks at refrigerated temperatures.

Cutting fresh apples bruises the parenchyma tissue of the apples and breaks cell walls, which results in decompartmentization of the cellular contents. Such tissue damage can lead to undesirable quality changes in the apples, such as:
1. increase in respiration rate;
2. acceleration in ripening and senescence;
3. reduction in textural crispness and firmness;
4. enhanced enzymatic browning; and
5. increased microbial contamination and growth.

With an increase in respiration rate, the acidity of the apple tissue is reduced due to respiratory catabolism of the organic acids and an increased amount of carbon dioxide is produced. Large amounts of carbon dioxide can lead to excessive carbonation of the apple tissue. If the apples are packaged, excess carbon dioxide production can also cause ballooning of sealed flexible plastic packages. It is therefore desirable to reduce the respiration rate of packaged cut apples.

The firmness of cut apple pieces decreases steadily during refrigerated storage. This reduction in firmness can be attributed to the breakdown of intercellular pectic substances during ripening, which is triggered by ethylene. The biosynthesis of ethylene is accelerated when apple tissue is damaged during the cutting process. The sensory attributes of crispness are related to the firmness of apple tissue, to the strength of intercellular bridging, and to the level of cellular turgor, the protoplasmic fluid pressure on the cell walls. Reducing ripening reactions, particularly reducing ethylene synthesis, can assist in maintaining the crisp texture of cut apple pieces.

When fresh apples are cut into pieces and exposed to the air, the tissue surfaces become brown within a few hours. The rate of cut apple browning depends on the age of the apple, the cultivar and the level of tissue damage on the cut surfaces. Browning is brought about by the enzymatic conversion of naturally-occurring phenolic compounds to quinones, which subsequently react non-enzymatically to form brown-coloured polymers called melanins. Enzymatic browning of cut apple pieces can be attributed to the action of polyphenol oxidase on the phenolic compound substrates in the presence of oxygen. The formation of brown-colored melanins on the surfaces of cut apple pieces can be inhibited by inactivating the polyphenol oxidase, maintaining the phenolic compounds in a reduced state, or preventing oxygen from coming into contact with the cut apple surfaces.

Sulfites in solution have been used to prevent enzymatic browning by inactivating polyphenol oxidase and reducing quinones. A citric acid solution with added ascorbic acid has also been employed as a dip solution for cut apple pieces to inhibit browning. Citric acid lowers the pH of the apple below the optimum level for polyphenol oxidase activity (pH 6.2). Ascorbic acid in dip solutions can interrupt the chemical reaction of browning by reducing quinone compounds to the dihydroxy phenolic forms.

Functional additives can be added to cut apple pieces to inhibit specific quality deteriorative changes during prolonged refrigerated storage. However, some additives can lead to undesirable textural changes and off-flavour development. For example, citric acid in a dip solution can cause an increase in sourness of apple pieces. Calcium salts have been used as firming agents, but at high concentrations they can impart a bitter taste in the apple pieces and can contribute to a leathery texture in place of the normally crisp texture associated with apples. Methodologies for reducing or eliminating these undesirable textural changes and off-flavour development brought about by functional additives would be beneficial.

U.S. Pat. No. 5,939,117, Chen et al., Aug. 17, 1999 discloses methods of preserving fresh fruit with fresh fruit preservatives which extend the shelf life of fresh fruit particularly fresh cut fruit, are provided. The fresh fruit preservative preserves the texture, flavor, appearance, crispness, and color of the fresh fruit, particularly the exposed skin of the fresh fruit. The method includes the following steps: providing a solution of fruit preservative comprising: water, calcium ions; and ascorbate ions, wherein the ascorbate ions and calcium ions are present in a ion ratio of preferably from about 1.5:1 to about 2.5:1 at a near neutral pH of 6.0 to 6.3; and, applying said fruit preservative to the fruit. The fruit is then stored at a temperature which will not freeze the fruit; temperatures of −6° C. have been found not to freeze the apples. Preferably the fruit is stored at temperatures of between about −7° C. to room temperature, about 20° C., more preferably about −2° to about 7° C., most preferably from about 2° C. to about 5° C. The invention also relates to fresh fruits preserved with the fresh fruit preservatives.

SUMMARY OF SPECIFIC EMBODIMENTS OF THE INVENTION

This invention is directed to novel compositions which are formulations of mixtures of functional additives, which can be dissolved in water to form dip solutions for treating cut apples. Apples treated in this way can be stored in modified atmosphere packages. The formulations prevent enzymatic browning, enhance and maintain textural firmness and crispness, retain surface brightness, and fortify nutrient value of cut apple pieces.

The invention in one embodiment is a novel formulation of functional compounds including ascorbic acid and one or more of calcium chloride, calcium hydroxide and calcium carbonate and, optionally, magnesium chloride, and sodium citrate or citric acid, which as mixtures of compounds are dissolved in water to form dip solutions for the treatment of fresh, cut apple pieces. The mixture comprises specific concentrations of the functional additives, especially concentrations of ascorbic acid and Ca ions derived from several sources. We have discovered that it is preferable if the Ca ions are derived from at least two and preferably three sources, notably calcium chloride, calcium hydroxide and calcium carbonate. Optimal ascorbic acid levels are about 5 to 10% (w/v) or preferably about 5.6 to 9% (w/v) in the dip solutions.

The levels of Ca ions are from about 0.45 to 0.68% (w/v). The molar ratios of ascorbic acid to Ca are from about 2.8:1 to 4.0:1 and optionally from about 2.8:1 to 3.5:1. Optionally, magnesium ion concentrations ate about 0.06 to 0.10% (w/v). The weight ratio of Ca ions to Mg ions is between about 5.4:1 to 11.3:1. Sodium citrate or citric acid can be added to modify the pH of the solutions to desirable levels.

This invention in another embodiment relates to a method of preserving the quality attributes of fresh, cut apple pieces by storing the treated cut apple pieces in modified atmosphere packages for prolonged periods up to 30 days at refrigerated temperatures. The method according to one embodiment of this invention consists of sequential process steps which include:

(i) washing whole fresh apples in a sanitizing solution, such as chlorinated water, to remove residual microorganisms on the apple skin to ensure low microbial counts on the cut apple pieces prior to further treatments;
(ii) coring and cutting peeled and unpeeled apples into pieces of suitable sizes for the effective diffusion of functional additives into the apple tissue;
(iii) immersing the apple pieces into the novel dip solution containing the functional additives for a suitable amount of time so that a requisite amount of each functional additive is transferred to the apple pieces:
(iv) removing excess dip solution from the apple piece surfaces by vibrational and high-velocity gas impingement operations to bring the residual surface liquid on the apple pieces to a level of about 0.5 to 4 grams per 100 $cm^2$ of surface area;
(v) packaging the cut apple pieces into containers with specific gas barrier properties for transmission of oxygen into the containers and transmission of carbon dioxide out of the containers to establish an equilibrium gas atmosphere in the packaging; and
(vi) quick-chilling the treated cut apple pieces in sealed containers at temperatures of 0 to 4° C. for at least 24 hours. Cold chilling can inhibit the growth of many types of spoilage organisms and can lower the rates of respiration and ripening.

In one aspect, the pH can be adjusted with citric acid or sodium citrate to lower the solution pH to optimum levels.

The invention in another embodiment is directed to a solution of functional additives useful for the preservation of cut apple pieces comprising about 8% (w/v) ascorbic acid, about 0.5% to 1% (w/v) calcium chloride dihydrate, about 0.5% (w/v) calcium carbonate and/or about 0.05 to 0.1% calcium hydroxide, the remainder water, and a pH of 3.5 to 4.5.

The solution can additionally include 0.5% (w/v) magnesium chloride. The magnesium chloride can be magnesium chloride hexahydrate or anhydrous magnesium chloride.

Packaging the apple pieces into containers according to another embodiment of the invention can comprise packaging the apple pieces into plastic containers having gas permeabilities of 100 to 180 $cm^3$ of oxygen per 100 $inches^2$ per 24 hours at 25° C. at 1 atmosphere and 400 to 1000 $cm^3$ of carbon dioxide per 100 $inches^2$ per 24 hours at 25° C. at 1 atmosphere.

A headspace can be provided in the containers. A volume ratio between 0.2:1 and 2:1 can be provided between the headspace and the apple pieces. The apple pieces can be packaged into containers filled with air. The containers can be flushed with gas having a mixture of about 15% $O^2$ (vol), about 5% $CO^2$ (vol), and about 80% $N^2$ (vol).

DETAILED DESCRIPTION OF SPECIFIC EMBODIMENTS OF THE INVENTION

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

The invention is a novel formulation of mixtures of functional additives for prolonging the freshness of cut apple pieces including ascorbic acid and calcium chloride, calcium carbonate, calcium hydroxide and, optionally, magnesium chloride, and sodium citrate or citric acid, which are dissolved in water to form dip solutions for the treatment of fresh, cut apple pieces. Each of the functional additives has one or more contributory properties for inhibiting deteriorative quality changes in the stored, packaged apple pieces. Further, ascorbic acid as well as the calcium salts and magnesium chloride are beneficial as nutrient additives for fortification of the apple pieces. The functional additives have been formulated so that the presence of the functional additives in the treated, stored apple pieces does not lead to any off-taste or off-flavour of apple pieces.

The specific formulation of the mixtures of functional additives is based on the effectiveness of the additives in retarding the enzymatic browning, enhancing and maintaining textural crispness and crunchiness, retaining the brightness of the surfaces, eluding off-taste and off-flavour development and supplementing the nutritive value of apple pieces.

The formulation comprises ascorbic acid at levels of about 5 to 10% (w/v) or preferably about 5.6 to 9% (w/v) in the aqueous dip solutions, which acts as a reducing agent, a chelating agent when it diffuses into cut apple pieces and a source of vitamin C when ingested. The high concentrations of ascorbic acid at 8 to 10% (w/v) in the dip solutions are preferable for the transport of sufficient amounts of ascorbic acid into the cut apple pieces over a relatively short dipping time. With dipping times of 0.5 to 3 minutes, the initial residual ascorbic acid content in cut apple pieces reaches about 200 to about 500 mg per 100 grams of apple.

Such levels of ascorbic acid are necessary for the prevention of enzymatic browning during the refrigerated storage of the packaged apples pieces, and even during a period of several days after the packages are opened. As well, at such high levels of ascorbic acid in apple tissue, any loss of ascorbic acid through autooxidation and oxidation enzyme catalyzed by naturally-occurring ascorbate oxidase in the apples should not significantly affect inhibition of enzymatic browning. With ascorbic acid levels between about 200 and about 500 mg per 100 grams of apple, the apple pieces can be considered an excellent source of vitamin C when ingested. Further, the naturally occurring phenolic compounds in the apples will be maintained in their reduced state, and therefore are valuable antioxidant nutraceuticals.

Calcium containing compounds are included in the formulation to provide calcium ions for bridging pectin molecules in the middle lamellae and cell walls of cut apple pieces which help to enhance and maintain the firmness and crispness of the cut apple pieces. When calcium containing compounds are employed as firming agents in dip solutions of fresh cut apple pieces at neutral pH solution, the diffusion of Ca ions is usually limited primarily to the near-surface tissue because of the interaction of the Ca ions with carboxyl groups of resident pectin. Because there can be limited penetration of Ca ions into fresh cut apple pieces, strengthening of the middle lamellae between cells only occurs in near-surface tissue. As a result, quality defects such as localized tissue toughness or leatheryness may become apparent. Ideally, the even distribution of Ca ions throughout the cut apple pieces would be preferable to obviate the localized, near-surface toughness and to strengthen the middle lamellae in the interior tissue of the apple pieces as well as the lamellae in the near-surface areas. The benefit of an even distribution of Ca ions throughout cut apple pieces is the maintenance and enhancement of firmness and crispness of stored, refrigerated apple pieces.

Advantageously, high levels of ascorbic acid (5.6 to 9% (w/v)) in the dip solutions are beneficial for the effective ascorbic acid chelation of Ca ions which results in the transport and even distribution of Ca ions throughout the apple pieces. Ascorbic acid is a weak chelating agent with a stability constant (log K) of about 0.2 for Ca ions, and thus, at the high ascorbic acid levels in the dip, a majority of the added Ca ions in the dip solutions should be chelated. As the chelate diffuses into an apple piece, Ca ions are apportioned to the middle lamellae and cell walls throughout the entire apple piece for the enhancement and maintenance of textural attributes. The chelation of Ca ions by ascorbic acid obviates the undesirable limited diffusion of Ca ions to only the near-surface areas of apple pieces which thereby eliminates the consequence of toughness and leatheriness of the apple pieces. Further, the carboxyl groups in the pectin in the middle lamella are dissociated and thus the calcium ions can diffuse readily into the apple tissue. The benefit of evenly distributing Ca ions throughout the apple pieces is the maintenance and enhancement of firmness and crispness of stored, refrigerated cut apple pieces.

Of particular importance are the concentration levels of ascorbic acid and calcium ions for accomplishing the goal of preserving the textural quality of fresh cut apples during prolonged, refrigerated storage. Since calcium salt solutions typically have an unattractive bitterness, low levels of the calcium salts are preferred for the dip solutions. The formulations according to specific aspects of the invention have the following quality attributes with particular reference to the ascorbic acid and calcium ion levels in dip solutions:
1. The formation of ascorbic acid-Ca chelate with its attendant properties;
2. The potential oxidation of ascorbic acid and the consequences of such an event on the preservation of texture (e.g. erythorbic acid, the oxidized ascorbic acid compound, cannot chelate Ca ions);
3. An effective molar ratio of ascorbic acid and calcium ions for enhancing textural attributes;
4. Demethylation of pectin in cut apple pieces during prolonged refrigerated storage which otherwise results in reduced firmness of the apple pieces; and
5. The necessity of high concentrations of ascorbic acid in dip solutions for rapid diffusion into the apple pieces to bring an ascorbic acid content between about 200 to about 500 mg per 100 grams of apple.

We have discovered that a preferred molar ratio of ascorbic acid to Ca ions is between about 2.8:1 to about 4.0:1, and preferably about 2.8:1 to about 3.5:1. We have also found unexpectedly that it is preferable if the Ca ions are obtained from two or more sources.

One of the preferred sources of calcium is calcium chloride dihydrate because it is very soluble in water, it is stable as a hydrate and it contributes chloride ions, which also assist in inhibiting enzymatic browning by reducing polyphenol oxidase activity. However, the level of calcium chloride dihydrate cannot be too high because it imparts a salty or bitter taste to the apples. Also, the pH level obtained from using calcium chloride dihydrate is lower than desirable. Other preferred sources of calcium are calcium carbonate and/or calcium hydroxide, which are more basic in nature than calcium chloride dihydrate. Their inclusion in the formulations raises the acidic dip solutions to pH levels between about 3.5 and 4.5. These pH values are preferable because they are similar to those of many popular apple varieties and such values impede the oxidation of ascorbic acid. Calcium carbonate as a component of the dry mix when added to water decomposes to form carbon dioxide gas and calcium ions by interacting with the hydrogen ions of the ascorbic acid and serves as an additional antioxidant.

The formulation in another embodiment optionally comprises magnesium chloride as a source of magnesium ions which preserve the brightness and brilliance of the surfaces of apple pieces. The preferred source of Mg ions is magnesium chloride because it is very soluble in water, it is stable as a hydrate, and again it contributes chloride ions which assist in inhibiting enzymatic browning. A solution of magnesium chloride has a very low bitter taste sensation so this is not a problem. In this invention, the desirable levels of Mg ions in the dip solutions are between 0.06 and 0.10%.

The formulation in another embodiment may also optionally contain citric acid or sodium citrate. The dip solutions with the required functional additives should preferably have pH levels between 3.5 and 4.5, to resemble the pH of most apple varieties. Sodium citrate or citric acid may be used as optional functional additives for the adjustment of the pH to these levels. Citric acid may be of value if any Fe(III) and Cu(II) ions are present in the dip solutions due to the water used for the preparation of the dip solutions. Cu(II) and Fe(III) are catalysts for the oxidation of ascorbic acid. Citric acid is an excellent chelating agent for Cu(II) and Fe(II). The stability constants (log K) for chelates of citric acid-Cu(II) and citric acid-Fe(III) are 6.1 and 11.9, respectively.

In a further embodiment of the invention, the mixtures of functional additives are typically prepared by mechanically blending the functional additives in the dry state to attain an even distribution of the compounds. A suitable dip solution can be readily prepared by dissolving a specified amount of functional additives mixture in a specified amount of water.

A preferred formulation for preparing the apple dip solution according to one embodiment of the invention is:
(a) ascorbic acid 84% (w/w);
(b) calcium chloride dihydrate 5% (w/w);
(c) calcium hydroxide 1% (w/w); and
(d) calcium carbonate 10% (w/w).

The invention in a further embodiment is also directed to a method of treating and preserving cut apple pieces. The sequential process steps of the method include:
(i) washing whole fresh apples in chlorinated water to inactivate residual microorganisms on the apple skin to ensure low microbial counts on the cut apple pieces prior to further treatments;
(ii) coring and cutting peeled and unpeeled apples into pieces of suitable sizes for the effective diffusion of functional additives into the apple tissue;
(iii) immersing the apple pieces into the novel dip solution containing the functional additives for a suitable amount of time so that a requisite amount of each functional additive is transferred to the apple pieces:
(iv) removing excess dip solution from the apple piece surfaces by vibrational and high-velocity gas impingement operations to bring the residual surface liquid to a level of about 0.5 to 4 grams per 100 $cm^2$ of surface area;
(v) packaging the cut apple pieces into containers with specific gas barrier properties for transmission of oxygen into the containers and transmission of carbon dioxide out of the containers to establish an equilibrium gas atmosphere in the packaging; and (vi) quick-chilling the treated cut apple pieces in the sealed containers to reduce apple core temperatures to about 0 to 4° C. within 8 hours. Cold chilling can inhibit many types of spoilage organisms from multiplying and can lower the rates of respiration and ripening.

During immersion in the dip solution, the apple pieces attain ascorbic acid levels of between about 200 and about 500 mg per 100 grams within a few minutes. Excess dip solution on the surfaces of apple pieces is removed by vibrational and/or high velocity gas impingement operations to bring the residual surface liquid to a level of about 0.5 to 4 grams per 100 $cm^2$ of surface area. Without the removal of the surface liquid, undesirable slime-producing microorganisms can grow during the storage period of the packaged apple pieces.

The treated apple pieces are packaged in containers with specific gas barrier properties so that an equilibrium gas atmosphere in the headspaces can be established during the prolonged, refrigerated storage of the apple pieces. Generally the container is a flexible plastic bag or a semi-rigid plastic cup or a tray with a top web of plastic film.

The ratio of the headspace volume to the product volume in a closed container is between 0.2:1 and 2:1. The walls of the containers preferably have gas permeabilities of about 100 to 180 $cm^3$ of oxygen per 100 $inches^2$ per 24 hours @ 25° C. at 1 atmosphere and 400 to 1000 $cm^3$ of carbon dioxide per 100 $inches^2$ per 24 hours @ 25° C. at 1 atmosphere. The equilibrium modified atmosphere in the headspace of a container packed with apple pieces should have an oxygen content of between 1 and 4% vol. and a carbon dioxide content of between 5 and 20% vol. throughout the storage period.

The purpose of the modified atmosphere packaging of apple pieces is three-fold, namely impeding the respiration rate, inhibiting the growth of microorganisms, and retarding the rate of ripening. All of these restrictive actions can contribute to prolonging the shelf life of the packaged apple pieces in addition to the beneficial properties created by the dip formulations.

When whole apples are peeled and cut into pieces, the rupturing and bruising of the cells bring about an increase in the rates of respiration and ripening. With such rate increases, the quality attributes of cut apple pieces diminish. Lowering the rate of respiration of apple pieces has the following benefits:
1. Reducing the loss of sugars to help maintain the sweetness and taste of the product;
2. Reducing decomposition of organic acids to maintain sugar/acid ratio, taste, and acceptable pH in the product;
3. Reducing the rate of ATP synthesis in the oxidative phosphorylation reactions with the consequence of a decrease in ethylene synthesis and a reduction in ripening and senescence.

Lowering the rate of ripening of apple pieces has the benefit of retaining the textural attributes of firmness and crispness in the apples. During ripening of apple tissue, the pectin in the middle lamellae undergoes demethylation and hydrolysis to bring about undesirable softening of the tissue. Ethylene production, which occurs when apples are peeled and cut, is responsible for the synthesis and activation of enzymes responsible for the pectin degradation in the middle lamellae during ripening. Ethylene synthesis in cut apple tissue can be impeded by restricting the entrance of oxygen into the apple pieces and by increasing the carbon dioxide content in the apple tissue.

In one of the embodiments of this invention, modified atmosphere packaging of apple pieces has been found to be advantageous for reducing the rates of respiration and ripening. By selecting packaging material with specified gas permeabilities and by introducing air into the headspace (with the volume being specified in relation to the volume of cut apple pieces), equilibrium modified atmospheres can be established for reducing the rates of respiration and ripening. The equilibrium modified atmospheres in the headspaces of packaged apple pieces should have an oxygen content of between about 1 and 4% vol. and a carbon dioxide content of between about 5 and 20% vol. during storage at refrigerated temperatures, preferably between about 0 and 4° C. Microbial growth can be retarded under these modified atmosphere conditions for packaged apple pieces. At such low levels of oxygen in the headspaces, mold and other types of aerobic organisms are inhibited from growing.

The requisite equilibrium modified atmospheres in the headspaces of packaged apple pieces is dependent on the following parameters:
1. gas permeabilities of the walls of the containers;
2. the ratio of headspace volume to product volume;
3. type and size of containers including surface area of film;
4. quick-chilling of the packaged apple pieces;
5. respiration rate of the apple pieces Plastic films can be used as walls of the containers or as top webs on containers in this present invention. Since apple pieces, packed in closed containers, require some oxygen for minimal aerobic respiration in order to prevent anaerobic off-flavour development, a plastic film with a specific oxygen transmission value (gas permeability) must be selected. Further, such plastic film must transmit the respiratory carbon dioxide in the headspace to the outside environment with a suitable plastic film as walls or top web of containers, the equilibrium modified atmospheres in the headspaces of packaged apple are to be composed of about 1 to 4% vol. oxygen and about 5 to 20% vol. carbon dioxide throughout the storage period. The plastic film walls and top webs of containers are to have gas permeabilities of 100 to 180 $cm^3$ of oxygen per 100 $inches^2$ per 24 hours @ 25° C. at 1 atmosphere and 400 to 1000 $cm^3$ of carbon dioxide per 100 $inches^2$ per 24 hours @25° C. at 1 atmosphere.

The headspace can be considered as a reservoir of oxygen and carbon dioxide gases. As the oxygen in the headspace is transmitted to the slowly respiring packaged apple pieces, oxygen is replenished by the transmission of the gas through the walls or top web of the containers from the outside air. As carbon dioxide is gradually produced by apple cell respiration, the excess carbon dioxide accumulating in the headspace is transmitted through the walls or top web of the containers. Generally, since the surface area around the headspace is the major site for gas transmission, the headspace volume in relation to the volume of apple pieces (which consume and respire the gases) must be a determining parameter.

Popular apple cultivars have different respiration rates at a constant temperature. Carbon dioxide is produced in the cells of apples by the Krebs cycle enzymes in the presence of dissolved oxygen. As the temperature of apple pieces rises above 0° C., the rate of respiration increases with the result of an increase in the production of carbon dioxide and a decrease in the dissolved oxygen concentration in the cells.

Quick-chilling of cut apple pieces in a sealed container to a core temperature between about 0 to 4° C. within 8 hours can be carried out to cold shock spoilage organisms for inactivation. Quick-chilling of apple pieces will also lower the rates of respiration and ripening of the apple pieces, thereby retarding quality deterioration. Subsequently, the packaged apple pieces can be stored at temperatures between about 0 and 10° C., and preferably between about 0 and 4° C.

At storage temperatures higher than 10° C., the respiration rates in the packaged apple pieces can be high enough that anaerobic respiration is initiated with the consequence of off-flavour development. High levels of carbon dioxide production could lead to package ballooning. Thus the quick-chilling of packaged apple pieces to core temperatures of about 0 to 4° C. within 8 hours and refrigerated storage at temperatures below 10° C., preferably between about 0 to 4° C., is preferable for prolonged storage of the apple pieces.

In a further embodiment of the invention, we have discovered that the initial input gas in the headspace of a package of apple pieces can be air. With air in the headspace of a sealed container of apple slices, initially, we have discovered that the requisite equilibrium modified atmosphere of carbon dioxide and oxygen can gradually be established in about 2 to 7 days.

The effectiveness of various embodiments of the invention has been established by conducting various trial and error tests, such as the following representative examples.

Example 1

Royal Gala and Granny Smith apples were selected on the basis of having no surface blemishes, firmness pressure of about 14 lbf, no internal physiological injury, and acceptable quality attributes.

Whole apples were washed in a 200 ppm available chlorine solution for about 2 minutes, rinsed with water, and dried. Each apple was cored and sliced into 10 equal-sized unpeeled pieces. The average weight of each apple piece was about 13 grams.

The cut apple pieces were immersed for 2 minutes in a dip solution consisting of 8% (w/w) ascorbic acid at about 20° C. The pH of the dip solution was about 2.4. The excess dip solution was removed from the apple surfaces by high velocity air impingement from air knives.

About 500 grams of apple pieces were placed in each plastic pouch constructed with a plastic film having an oxygen transmission rate of 141. The dimensions of the pouch were 25 cm by 31 cm. The pouches were filled with input gases consisting either of air with no gas flushing required, or a mixture of 15% oxygen, 5% carbon dioxide and 80% nitrogen which was first flushed into the pouches. The heat-sealed pouches with apple pieces were placed in an air blast refrigerated room at 2° C. for 2 days for quick-chilling of the apple pieces. Subsequently, the packaged apple pieces were stored at 5° C. for various periods of time.

A sensory panel evaluated the quality attributes of representative apple pieces samples for each variety under the modified atmosphere conditions as the storage time progressed up to 25 days. Each quality attribute was rated on a scale of 1 to 5, 5 being excellent, 4 being very good, 3 being good and scores below 3 as poor and not acceptable. The quality attributes selected for evaluation were appearance, odour, flavour, and texture. This test was considered to be unacceptable because the texture of the apple slices was soft and unappealing for storage periods beyond 21 days.

Example 2

Royal Gala and Granny Smith apples were selected on the basis of having no surface blemishes, firmness pressure of about 13 to 17 lbf, no internal physiological injury, and acceptable quality attributes.

The apples were washed in a 200 ppm available chlorine solution for about 2 minutes, rinsed with water, and dried. Each apple was cored and sliced into 10 equal-sized unpeeled pieces. The average weight of each apple piece was about 13 grams.

The cut apple pieces were immersed for 2 minutes in a dip solution consisting of 8% (w/w) consisting of 82.5% (w/w) ascorbic acid, 10% (w/w) calcium chloride dihydrate, 5.0% (w/w) calcium hydroxide and 2.5% (w/w) magnesium chloride hexadrate at about 20° C. The pH of the dip solution was 3.6. The excess dip solution was removed from the apple surfaces by high velocity air impingement from air knives.

About 500 grams of apple pieces were placed in each plastic pouch constructed with a plastic film having an oxygen transmission rate of 141. The dimensions of the pouch were 25 cm by 31 cm. The pouches were filled with input gases consisting either of air with no gas flushing required, or a mixture of 15% (vol) oxygen, 5% (vol) carbon dioxide and 80% (vol) nitrogen which was first flushed into the pouches. The heat-sealed pouches with apple pieces were placed in an air blast refrigerated room at 2° C. for 2 days for quick-chilling of the apple pieces.

Subsequently, the packaged apple pieces were stored at 5° C. for various periods of time.

A sensory panel evaluated the quality attributes of representative apple pieces samples for each variety under the modified atmosphere conditions as the storage time progressed up to 21 days. Each quality attribute was rated on a scale of 1 to 5, 5 being excellent, 4 being very good, 3 being good and scores below 3 as poor and not acceptable. The quality attributes selected for evaluation were appearance, odour, flavour, and texture.

As shown in Table 1, the scores of the fresh, unstored, undipped apple pieces (day 0) were in the vicinity of 3.8 to 4.1 for both Granny Smith and Royal Gala. The overall acceptability scores for both varieties of fresh apple slices were 3.9. After 21 days of storage at refrigerated temperatures, the Granny Smith and Royal Gala apple slices received overall acceptability scores of between 3.6 and 3.7 for both air and 15:5:80 oxygen, carbon dioxide, nitrogen input gas conditions as shown in Table 1. None of the individual quality attributes had scores lower than 3.5.

TABLE 1

Effect of apple cultivar and input gases on the quality attributes of apple slices stored for 21 days at refrigerated temperatures.

| Apple Cultivar | Store Time (Days) | Sensory Evaluation (1-5) | | | | | | | |
|---|---|---|---|---|---|---|---|---|---|
| | | Air | | | | 15% $O_2$:5% $CO_2$:80% $N_2$ | | | |
| | | Appearance | Odour | Flavour | Texture | Appearance | Odour | Flavour | Texture |
| Granny Smith | 0 | 3.9 | 3.8 | 3.8 | 4.1 | 3.9 | 3.8 | 3.8 | 4.1 |
| Granny | 21 | 3.5 | 3.5 | 3.7 | 3.8 | 3.5 | 3.6 | 3.7 | 3.8 |

TABLE 1-continued

Effect of apple cultivar and input gases on the quality attributes of apple slices stored for 21 days at refrigerated temperatures.

| Apple Cultivar | Store Time (Days) | Sensory Evaluation (1-5) | | | | | | | |
|---|---|---|---|---|---|---|---|---|---|
| | | Air | | | | 15% O$_2$:5% CO$_2$:80% N$_2$ | | | |
| | | Appearance | Odour | Flavour | Texture | Appearance | Odour | Flavour | Texture |
| Smith Royal Gala | 0 | 4 | 3.8 | 3.8 | 3.8 | 4 | 3.8 | 3.8 | 3.8 |
| Royal Gala | 21 | 3.6 | 3.5 | 3.6 | 3.8 | 3.6 | 3.6 | 3.7 | 3.8 |

The texture of the apple pieces at day 21 was rated as firm, crisp and crunchy. The surface and interior flesh of these apple pieces had no visual brown coloration and the brightness of the apple surfaces was apparent. No off-taste or off-flavour was experienced by sensory panel members, but the pleasant apple flavour was evident in all samples. Therefore, with a storage time of 21 days, the apple pieces of both varieties, stored under either of the input gases, had quality attribute scores which were only slightly below those for fresh, unstored, undipped apple pieces.

It appears that air as the initial input gas was equally as effective as the 15:5:80 oxygen:carbon dioxide:nitrogen gas input for preserving the quality attributes of the apples for up to 21 days at 5° C. If air is to be used as an input gas, gas flushing equipment would not be necessary and sealing operations would be simplified.

Example 3

Royal Gala and Granny Smith apples were selected on the basis of having no surface blemishes, firmness pressure of about 13 to 17 lbf, no internal physiological injury, and acceptable quality attributes.

The apples were washed in a 200 ppm available chlorine solution for about 2 minutes, rinsed with water, and dried. Each apple was cored and sliced into 10 equal-sized unpeeled pieces. The average weight of each apple piece was about 13 grams.

The cut apple pieces were immersed for 2 minutes in a dip solution consisting of 8% (w/w) solution of premix consisting of 84.2% (w/w) ascorbic acid, 5% (w/w) calcium chloride dihydrate, 0.8% (w/w) calcium hydroxide, 10% (w/w) calcium carbonate at about 20° C. The pH of the dip solution was 4.3. The excess dip solution was removed from the apple surfaces by high velocity air impingement from air knives.

About 500 grams of apple pieces were placed in each plastic pouch constructed with a plastic film having an oxygen transmission rate of 141. The dimensions of the pouch were 25 cm by 31 cm. The pouches were filled with input gases consisting either of air with no gas flushing required, or a mixture of 15% (vol) oxygen, 5% (vol) carbon dioxide and 80% (vol) nitrogen which was first flushed into the pouches. The heat-sealed pouches with apple pieces were placed in an air blast refrigerated room at 2° C. for 2 days for quick-chilling of the apple pieces. Subsequently, the packaged apple pieces were stored at 5° C. for various periods of time.

A sensory panel evaluated the quality attributes of representative apple pieces samples for each variety under the 2 modified atmosphere conditions as the storage time progressed up to 21 days. Each quality attribute was rated on a scale of 1 to 5, 5 being excellent, 4 being very good, 3 being good and scores below 3 as poor and not acceptable. The quality attributes selected for evaluation were appearance, odour, flavour, and texture. The scores for this test ranged between 3.5 and 4.0 at day 21. The addition of the calcium carbonate was observed to have a beneficial effect because the carbonate ion generated carbon dioxide which displaced oxygen in the headspace and contributed to the preservation process. Calcium chloride is also of benefit because it is an anti-browning agent.

As will be apparent to those skilled in the art in the light of the foregoing disclosure, many alterations and modifications are possible in the practice of this invention without departing from the scope thereof. Accordingly, the scope of the invention is to be construed in accordance with the substance defined by the following claims.

What is claimed is:

1. A composition of functional additives useful for incorporating in water as a dip for the preservation of cut apple pieces comprising ascorbic acid and calcium ions, wherein the molar ratio between the ascorbic acid and the calcium ions is between about 2.8:1 to about 4.0:1, and wherein the composition further comprises magnesium ions, and the weight ratio between the calcium ions and magnesium ions is between about 5.4:1 and about 11.3:1.

2. A composition according to claim 1 wherein the molar ratio is between about 2.8:1 to about 3.5:1.

3. A composition according to claim 1, wherein magnesium ions are derived from magnesium chloride hexahydrate or anhydrous magnesium chloride.

4. A composition according to claim 1 wherein the calcium ions are derived from one or more of the group consisting essentially of calcium chloride dihydrate, calcium hydroxide and calcium carbonate.

5. A composition according to claim 1 wherein the calcium ions are derived from calcium chloride dihydrate.

6. A composition according to claim 1 wherein the calcium ions are derived from calcium hydroxide.

7. A composition according to claim 1 wherein the calcium ions are derived from calcium carbonate.

8. A composition according to claim 1 wherein the calcium ions are derived from calcium chloride dihydrate, calcium hydroxide and calcium carbonate.

9. A composition according to claim 1 including sodium citrate or citric acid as a pH adjuster.

10. A solution of functional additives useful for the preservation of cut apple pieces comprising:
   a. ascorbic acid having a concentration between about 5.0% and 9% (w/w); and
   b. calcium ions having a concentration between about 0.4% and 0.68% (w/w);

c. magnesium ions having a concentration between 0.06% and 0.10% (w/w);
d. water;
wherein the molar ratio between ascorbic acid and the calcium ions is between about 2.8:1 and 4.0:1.

11. A solution according to claim 10 wherein the molar ratio between ascorbic acid and calcium ions is between about 2.8:1 and about 3.5:1.

12. A solution according to claim 10 wherein the magnesium ions are derived from magnesium chloride hexahydrate or anhydrous magnesium chloride.

13. A solution according to claim 10 wherein the calcium ions are derived from one or more of the group consisting essentially of calcium chloride dihydrate, calcium hydroxide and calcium carbonate.

14. A solution according to claim 10 wherein the calcium ions are derived from calcium chloride dihydrate.

15. A solution according to claim 10 wherein the calcium ions are derived from calcium hydroxide.

16. A solution according to claim 10 wherein the calcium ions are derived from calcium carbonate.

17. A solution according to claim 10 wherein the calcium ions are derived from calcium chloride dihydrate, calcium hydroxide and calcium carbonate.

18. A solution according to claim 10 wherein the pH is adjusted with citric acid or sodium citrate.

19. A solution of functional additives useful for the preservation of cut apple pieces comprising water and about 5.6% to 9% (w/w) ascorbic acid, about 0.3% to 1% (w/w) calcium chloride dihydrate, about 0.5% (w/w) magnesium chloride, and about 0.06% to 0.5% (w/w) calcium hydroxide dissolved in the water, the solution having a pH of 3.5 to 4.5.

20. A solution according to claim 19 further including about 0.5% to 1.0% (w/w) calcium carbonate.

21. A solution according to claim 19, wherein the pH is adjusted with citric acid or sodium citrate.

* * * * *